Jan. 7, 1969   O. B. FERGUSON   3,420,478
PARACHUTE
Filed April 26, 1967
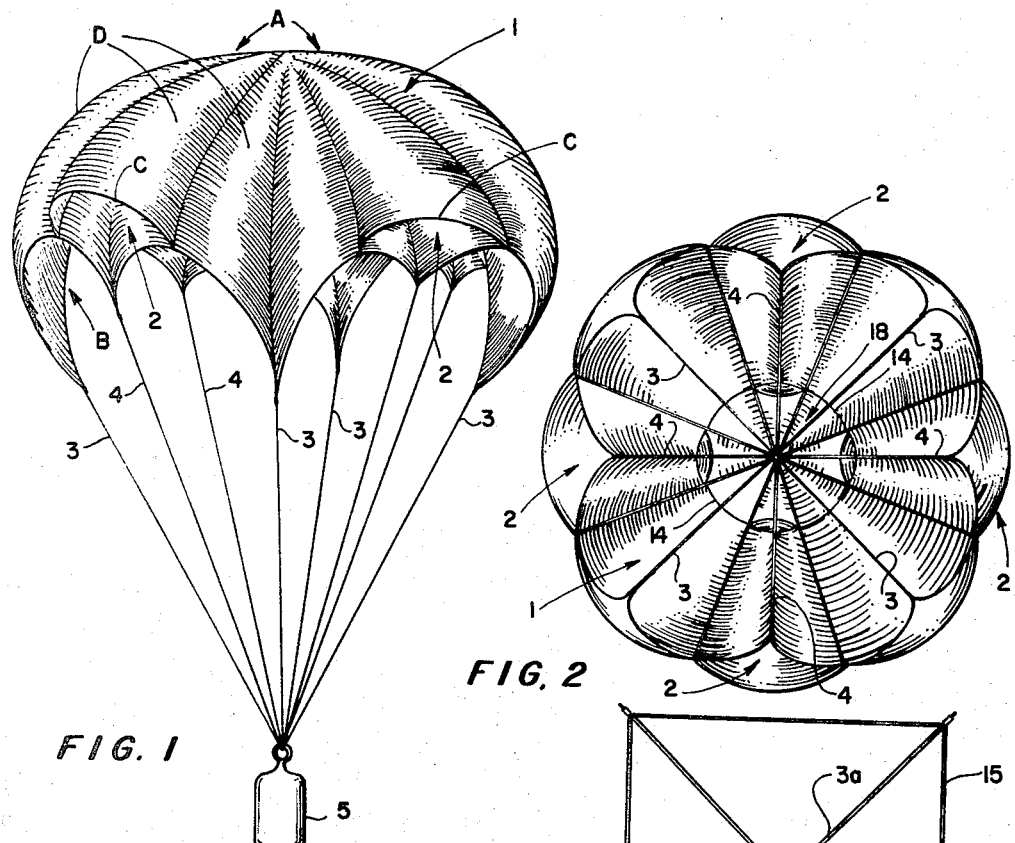
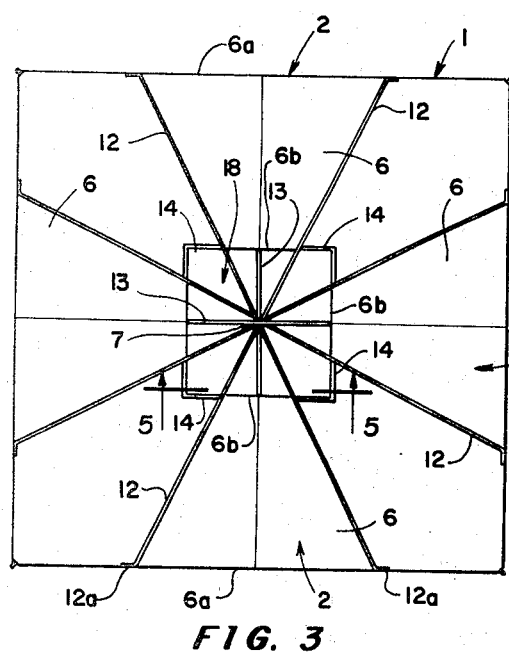
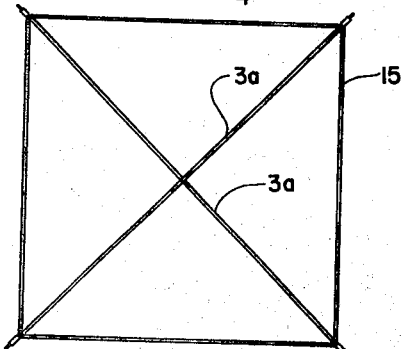
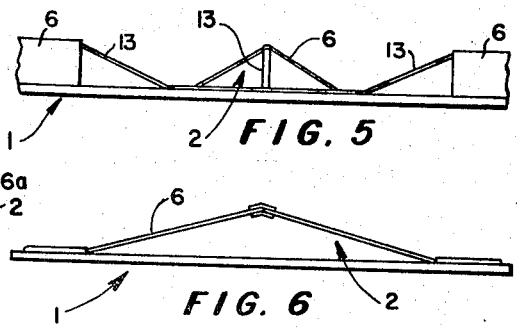
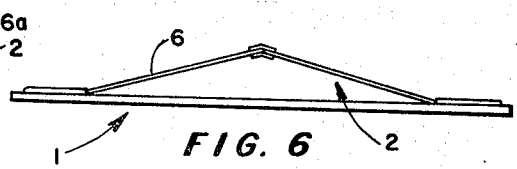
INVENTOR.
OTIS B. FERGUSON
BY
ATTORNEYS

United States Patent Office 3,420,478
Patented Jan. 7, 1969

3,420,478
PARACHUTE
Otis B. Ferguson, Alamogordo, N. Mex., assignor to Recovery Systems Research, Inc., Alamogordo, N. Mex., a corporation of New Mexico
Filed Apr. 26, 1967, Ser. No. 633,810
U.S. Cl. 244—142                                13 Claims
Int. Cl. B64d 17/02; B64d 17/14; B64d 17/18

ABSTRACT OF THE DISCLOSURE

Parachute apparatus including one air confining member or a plurality of suitably spaced air confining members carried by the canopy which are open at both ends and of decreasing section toward the apex for directing a restricted flow of air from an outward portion of the canopy toward the apex with its release at an increased velocity adjacent the central portion of the canopy.

---

This invention relates in general to air to ground payload lowering devices and more particularly to a parachute apparatus suitable for lowering various types of payloads through the air from selected elevations to selected locations.

In safely lowering various types of payloads discharged from an aircraft from selected altitudes, the parachute has heretofore been employed. Various types of payloads are currently lowered by use of parachutes including persons, sensitive instuments, and aircraft not having landing capabilities. For sensitive payloads such as instruments and persons, the parachute during descent must provide inter alia, a minimum of shock upon opening, stability during descent and a slow rate of descent so as to provide minimum shock on impact with the ground. When the payload is dropped from a relatively low elevation, a fast-filling feature is desirable.

Accordingly, it is an object of this invention to provide a simple, durable and easy to use parachute, suitable for shock sensitive payloads, such as instruments, aircraft and humans.

Another object of this invention is to provide a parachute having a fast filling time and a minimum of suspension lines which is suitable for low level drops.

A further object of this invention is to provide a parachute which has reduced shock upon opening a reduced descent rate, and which is very stable in descent.

Other objects and advantages and capabilities of the present invention will become apparent as the following description proceeds taken in conjunction with the drawings, in which:

FIG. 1 is an elevation view of a parachute embodying the present invention in the air filled descending condition with shroud lines and a payload supported therefrom;

FIG. 2 is a bottom plan view of the parachute shown in FIG. 1 with the payload removed for clarity;

FIG. 3 is a bottom plan view of the parachute of FIG. 1 with the canopy disposed in a flat condition and the air confining members moved to the extended position above the canopy;

FIG. 4 is a top plan view of the parachute of FIG. 3 drawn to a reduced scale to show the upper webbing arrangement;

FIG. 5 is a sectional view taken along lines 5–5, FIG. 3, and drawn to an enlarged scale illustrating the inner sectional shaping and dimension of an oppositely disposed air confining member and the cord extending across the apex interconnecting inner edges of opposing air confining members; and FIG. 6 is a fragmentary end elevation view of FIG. 3 showing the outer sectional shaping and dimension with the air confining member.

Referring now to the drawings, the parachute as illustrated in FIGS. 1 and 2 in the filled or descending condition, in general, includes canopy 1, air confining member 2 carried by the canopy, shroud or suspension lines 3 and 4 extending from the lower edges of the canopy and the lower edges of air confining members 2, respectively, which are connected at their opposite ends to a payload 5.

The canopy 1 is herein illustrated in a preferred form as of a generally square configuration (FIG. 3) and supports or carries at least one and preferably a plurality of air confining members 2 circumferentially disposed in spaced relationship at approximately 90° intervals between the corners of the canopy. Each of these air confining members comprise a piece of material 6 extending from an outer portion of the inner surface of the canopy toward its central portion and are wider in dimension at the outer open end 6a and narrower in dimension at the inner open end 6b. The inner end 6b of each of these pieces of material terminates in spaced relation to the apex 7 of the canopy and the outer end 6a extends to a coextensive relationship with the outer edge of the canopy between the corners.

This piece of material 6 is secured along its sides to the canopy by suitable means such as a webbing arrangement hereafter described to cover a portion of the undersurface of the canopy. This piece of material 6 is of greater width than the undersurface of the canopy which it covers and is extended by applying a pull or force at its central portion as shown in FIGS. 5 and 6 and is in spaced proximity to the covered surface of the canopy to form or define with the canopy an elongated passage of generally triangular shape section. This passage decreases in section from the outer edges of the canopy toward the apex of the canopy. Shroud or suspension lines 4 are attached at the outer edge 6a of the piece of material 6 between the outer edge of the piece of material and the payload so as to apply the force to pull the piece of material to a sufficiently extended position to quickly fill the air confining members 2 with air as illustrated in FIGS. 1 and 2 during descent of the parachute.

The webbing arrangement for securing the pieces of material 6 to the undersurface of the canopy 1 comprises a plurality of narrow strips of material 12 such as nylon or the like. Each strip of material 12 extends over the outer edge or skirt of each piece of material 6 and to the underlying canopy by sewing or the like. Each strip of material 12 preferably passes through the apex and extends to an opposite edge of the canopy. The outer ends 12a of the strips of material 12 extend along the outer edge or skirt of the canopy a short distance as is illustrated in FIG. 3. Shorter strips of material or cords 13 extend through the apex on the undersurface of the canopy and attach at their outer ends to opposing inner edges 6b of the pieces of material 6. A band of material 14 forming a right angle along its length extends between the adjoining pieces of material from associated strips of material 12.

The outer or upper surface of the canopy is provided with a webbing arrangement which includes a band or strip of material 15 extending along each edge or the skirt of the canopy to form a box shaped configuration and a strip or band of material 3a extending from each corner diagonally across the apex of the canopy to the opposite corner to form an X shaped configuration. The skirt band 15 is suitably joined at the corners to the strips of material 3a as by splicing or the like. This upper webbing arrangement is suitably secured to the canopy by stitching or the like.

Strips of material 3a of the upper webbing arrangement thereby extend continuously from the canopy corner and edge or skirt thereof across the apex and back to the opposite corner and edge or skirt thereof and are essentially extensions of the suspension lines 3 connected to the load so as to reinforce the canopy and suspend the load therefrom.

A parachute as above described and having an essentially square canopy when in the inflated condition as shown in FIGS. 1 and 2 in general has a profile including an upper portion or crown A of generally hemispherical and a lower portion B of a truncated cone shape. This lower portion B is formed by the corners of the canopy and is generally tangent to the associated suspension lines.

The inflated canopy has high arches C between the corners of the canopy and has pronounced bulges or lobes D therein. The corners of the canopy turn inwardly to form a negative angle of incidence and the lower portion B is of substantial length. The separation line between the upper portion A and the lower portion B can be considered a flow separation edge which creates the same effect as that obtained through the use of a high porosity fabric. The profile of upper portion A breaks away from the tangency point of the lower portion B to provide an essentially flattened top. This parachute has important characteristics including reduced opening velocity, reduced opening shock, improved stability and improved damping characteristics.

The type of webbing arrangement as described has substantially fewer suspension lines than the conventional circular canopy having 64 suspension lines because the load is divided between 8 suspension lines in the preferred arrangement shown. This reduces the weight in construction and lessens packing problems.

As an alternative for lighter loads and smaller canopy sizes where strength is not a requirement, suspension lines 4 may be replaced by a line extended from a lower portion or skirt of the piece of material 6 to the opposite piece of material so as to hold the air confining members open and thereby insure inflation. This will reduce the suspension lines to only those four extending from the corners of the canopy to the load and designated lines 3.

The air confining members 2 define an air flow course or passage of decreasing section toward the apex of the canopy along its inner or undersurface through which air is passed at a progressively increasing velocity or turbulent flow and the air is directed upwardly toward the apex before release adjacent the central portion 18 of the canopy 1. This air flow of increased velocity upon contacting the central undersurface portion 18 and the air flow from adjoining and opposing air confining members is directed downwardly through the central portion of the parachute so as to impart an upward thrust on the canopy. This thrust may be likened to the same effect as is produced by a helicopter and has a retarding effect or reduces the descent of the parachute. This air flow of progressively increasing velocity produced by the air confining members 2 upon release is directed to the center of the parachute to create a substantially dynamic air flow condition as distinguished from a static air condition as would be found in a conventional parachute once it is filled.

The generally square canopy with four air confining members 2 disposed in circumferentially spaced relation at approximately 90° as is illustrated provides opposing and also to a certain extent impinging relation of the air flow because of the adjoining and opposing relation of the discharge outlets of each at the central portion 18 of the canopy. While the arrangement of this disposition of air confining members 2 is preferred, it is understood that one or a plurality of such members may be suitable in other arrangements, such as, for example, two in oppositely disposed relationship at 180° intervals or three at 120° intervals.

Test results of parachute apparatus embodying the present invention indicate that the rate of descent as compared with conventional parachutes is substantially improved, as, for example, a parachute having a canopy diameter of approximately 64 ft. with a payload of approximately 1,500 lbs. was found to have a rate of descent of about 16.2 ft. a second as compared to a rate for a straight parachute of 24 ft. a second having a similar diameter and load. In addition, it has been found that the air confining members which are immediately opened by their attachment of the shroud lines to the payload produces a parachute which rapidly expands after discharge into the air so that the canopy has a faster filling time with less opening shock.

In further explanation of the structural arrangement and operation of the above described parachute, it is apparent that the parachute shown in FIGS. 1–6 may also be characterized as having a main canopy 1 with the usual shroud lines 3 extending from the canopy to the payload 5 in combination with the air confining members 6 which form secondary parachutes within the main canopy. The skirt portion or outer edge of these secondary parachutes into which air is passed are adjacent the skirt of the main canopy and have a vent for air egress adjacent the central inner surface portion of the main canopy 1.

Although a parachute embodying the present invention may be utilized for many different kinds of payloads, it has been found to be particularly suitable for instruments and persons because of its improved stability characteristics. In addition, because of its slow descent rate or quick opening rate, it has been found particularly suitable for low elevation drops.

While the air confining members have been shown and described for use with a particular canopy of square shaping, it is understood they are suitable for use with various other forms of known canopies. Further, it is understood that while the air confining members formed by the pieces of material as described are completely open at both ends, it is possible to provide arrangements which are not completely open at both ends.

I claim:

1. In a parachute including a canopy and shroud lines extending from an end portion of the canopy and arranged for connection to a payload, at least one piece of material extending from an outer to an inner portion of the canopy toward its central portion and secured along the sides to an undersurface portion of the canopy and having unsecured end portions, the width of said piece of material substantially greater than said undersurface portion of the canopy on which said piece is secured, and at least one means for attaching a shroud line to an intermediate portion of the piece of material so that pull by the shroud line extends the piece of material away from the canopy to form an open-ended air passage along the undersurface of the parachute, said shroud line being attached along the widest end of the piece of material and extending from a central portion of the piece of material so as to form an elongated passage of generally triangular section when pulled by the associated shroud line.

2. In a parachute including a canopy and shroud lines extending from a portion of the canopy and arranged for connection to a payload, at least one tubular air confining passage formed on an inner surface of the canopy, said passage having an air inlet at one end portion adjacent an outer edge portion of the canopy for air ingress and an air outlet of lesser section than the air inlet under the canopy adjacent a central inner surface portion of the canopy for air egress for directing a restricted flow of air from adjacent the outer edge portion of the canopy upwardly toward the apex before release adjacent its central inner surface portion during airborne descent of the parachute.

3. In a parachute as set forth in claim 2 including at least a pair of oppositely disposed tubular passages on the canopy having outlets for releasing air in opposing relation adjacent the central inner surface portion of the canopy.

4. In a parachute as set forth in claim 3 wherein said air confining passages are essentially conical shaped when air filled with said air inlet at the wider end and said air outlet at the narrower end thereof.

5. In a parachute including a canopy and shroud lines extending from a portion of the canopy and arranged for connection to a payload, a plurality of equally spaced tubular air confining passages on an inner surface of the canopy, each said passage being of progressively decreasing section in its extension from an outer skirt portion of the canopy radially toward the apex and having a wider air inlet for air ingress adjacent the skirt portion of the canopy and a narrower air outlet under the canopy, for air egress adjacent the inner surface of the central portion of the canopy for directing a restricted flow of air upwardly toward the apex before release adjacent its central inner surface portion, the inner surface of the central portion of the canopy arranged in proximity to the air outlets to impart a downward direction to the released flow from the air passages, thereby effectively reducing the rate of descent of the parachute and payload.

6. In a parachute as set forth in claim 5, wherein said plural air confining passages are four in number disposed at approximately 90° intervals.

7. In a parachute including a canopy and shroud lines extending from an end portion of the canopy and arranged for connection to a payload, at least one piece of material extending inwardly from adjacent an outer edge portion of the canopy and terminating adjacent its central portion, said material being secured along the sides to an undersurface portion of the canopy and having unsecured end portions, the width of said piece of material being substantially greater than undersurface portion of the canopy on which said piece is secured and progressively narrowing in width toward the apex, and at least one line means being supported from an intermediate portion of the piece of material and attached to the payload so that pull by the line means under the weight of the payload extends the piece of material away from an undersurface portion of the canopy to form a tubular air flow passage open at each end along the undersurface of the parachute for air ingress adjacent the outer edge portion of the canopy and air egress adjacent the central inner surface portion of the canopy.

8. In a parachute as set forth in claim 7, wherein said line means is attached to an intermediate portion along the widest end of the piece of material.

9. In a parachute as set forth in claim 7, wherein the canopy is of generally square shape and said shroud lines are attached to the corners of the canopy and said line means to an outer edge portion of said piece of material.

10. A parachute comprising a canopy, shroud lines extending from a portion of the canopy and arranged for connection to a payload, and a plurality of tubular air confining chambers arranged in an equally spaced radial pattern about the apex on an undersurface of the canopy, each said chamber being closed along its sides and of progressively decreasing section in its extension from an outer edge portion of the canopy toward the apex and having a wider air inlet for air ingress at an outer edge portion of the canopy and a narrower air outlet under the canopy, for air egress at the inner surface of the central portion of the canopy for directing air flow at a progressively increasing velocity from adjacent the outer edge portion upwardly along an undersurface of the canopy, the central portion directing air released from the chamber downwardly from the undersurface of the canopy so as to impart an upward thrust on the canopy during descent of the parachute.

11. A parachute assembly comprising a main canopy, shroud lines extending from the canopy and arranged for connection to a payload, at least a pair of oppositely disposed secondary parachutes formed on an inner surface of the canopy, each said secondary parachute having an air inlet adjacent an outer edge portion of the canopy for air ingress to air fill each secondary parachute during airborne descent and an air vent of lesser section than the air inlet adjacent a central inner surface portion of the canopy for air egress, each said secondary parachute being formed of a piece of material secured along its sides to the inner surface of the canopy and having unsecured end portions, the width of each said piece of material being substantially greater than the undersurface portion of the canopy on which said piece is secured and being of progressively narrower in width toward the apex of the canopy, each piece of material having a shroud line extending from an outer edge portion to the payload for spreading the piece of material away from the canopy when the payload is initially dropped to assist in the filling of the associated secondary parachute during airborne descent.

12. A parachute comprising an essentially square canopy, suspension lines disposed in spaced relation on the canopy and extending a substantial distance from its outer edges for connection of the canopy to a payload, said canopy when air filled having an upper portion of generally hemispherical shape and a lower portion of a truncated cone shape of substantial length, and at least a pair of oppositely tubular air confining chambers formed on an inner surface of the canopy, each said chamber being closed along its sides and having an air inlet at one end portion adjacent the outer edge of the canopy for air ingress and an air outlet of lesser section than the air inlet adjacent the central inner surface portion of the canopy for air egress for directing a restricted flow of air from adjacent the outer edge portion of the canopy upwardly toward the apex before release adjacent its central inner surface portion during airborne descent of the parachute.

13. A parachute comprising a canopy of generally square shape, shroud lines extending from the corners of the canopy and arranged for connection to a payload, and a plurality of air confining members carried by the canopy in spaced relation to said corners, at least one pair of opposed air confining members having shroud lines extending from a surface of the air confining member to the payload and defining an elongated open-ended passage of decreasing section extending from an outward portion of the inner surface of the canopy toward its central portion for confining a restricted flow of air upwardly toward the apex before release adjacent its central portion of the parachute during descent of the parachute.

References Cited

UNITED STATES PATENTS

| 1,872,705 | 8/1932 | Elliott | 244—145 |
| 2,683,575 | 7/1954 | Heinrich | 244—142 |
| 2,974,913 | 3/1961 | Steinthal | 244—145 |

MILTON BUCHLER, Primary Examiner.

R. A. DORNON, Assistant Examiner.

U.S. Cl. X.R.

244—145